A. C. BANFIELD.
MEANS FOR ILLUMINATING SMALL OBJECTS WITH INTENSE LIGHT.
APPLICATION FILED FEB. 6, 1920.
1,355,805.
Patented Oct. 19, 1920.
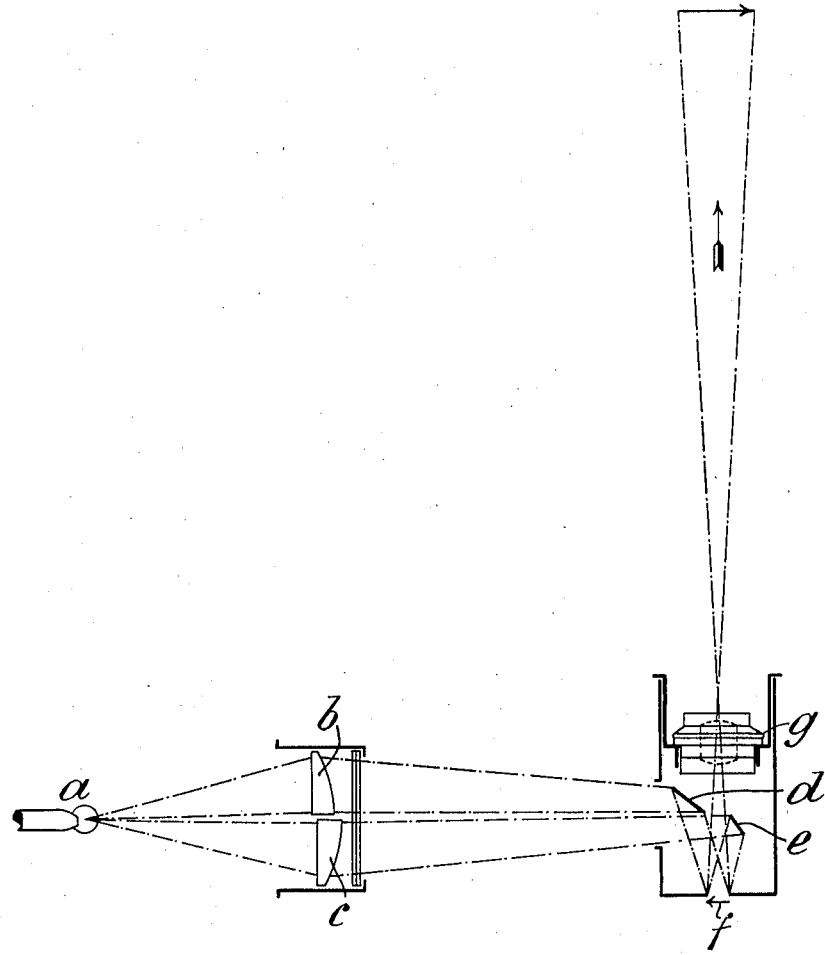

UNITED STATES PATENT OFFICE.

ARTHUR CLIVE BANFIELD, OF LONDON, ENGLAND, ASSIGNOR TO ADAM HILGER, LIMITED, OF LONDON, ENGLAND.

MEANS FOR ILLUMINATING SMALL OBJECTS WITH INTENSE LIGHT.

1,355,805.   Specification of Letters Patent.   Patented Oct. 19, 1920.

Application filed February 6, 1920. Serial No. 356,771.

*To all whom it may concern:*

Be it known that I, ARTHUR CLIVE BANFIELD, a subject of the King of Great Britain, residing at 75ª Camden road, London, England, have invented a new and useful Improved Means for Illuminating a Small Object with Intense Light, of which the following is a specification.

This invention relates to improved means for illuminating with intense light a small object such as a letter, the image of which it is desired to project upon a screen.

According to this invention a pencil from a source of light is reflected on to the object by means of two mirrors which have between them a gap through which the object may be viewed or through which an image of the object may be projected. The mirrors are so arranged that the edge of one mirror is in line with the adjacent edge of the other mirror so that none of the rays from the source of light can pass between them. The mirrors may be plane, or may be of spherical, cylindrical or toric shape, or of otherwise curved surface suitable for securing the desired concentration of light, and the mirrors may be used either with or without a condensing lens. In the particular combination of plane mirrors with the condensing lens, the condensing lens should be divided into two halves, one of which is advanced relatively to the other, so that the two images of the light source produced by the two mirrors should not only overlap, but should be in focus at one and the same time.

The accompanying drawing shows diagrammatically apparatus made in accordance with this invention.

$a$ is a source of light, the rays from which pass through a condensing lens divided into two halves $b$ and $c$, the half $c$ being advanced relatively to the half $b$. $d$ and $e$ are two mirrors having a gap through which an image of the object $f$ to be illuminated is projected. The mirrors $d$ and $e$ are so arranged that their adjacent edges are in line so that none of the rays from the source of light can pass between them.

$g$ is a lens by which the image of the object $f$ is projected on to a screen.

What I claim is:—

1. In means for illuminating a small object with intense light, a source of light, two mirrors having a gap between them, each adapted to reflect a portion of the light from the source and so arranged that the edge of one mirror is in line with the adjacent edge of the other mirror and that the rays from the mirrors combine to illuminate the small object.

2. Means for illuminating a small object with intense light, consisting of two plane mirrors having a gap between them through which the object may be viewed or through which an image of the object may be projected and so arranged that the edge of one mirror is in line with the adjacent edge of the other mirror so that none of the rays from the source of light can pass between them, and a condensing lens divided into two halves, one of which is advanced relatively to the other so that the two images of the light source produced by the two mirrors shall not only overlap but shall be in focus at one and the same time.

In testimony that I claim the foregoing as my invention I have signed my name this 22nd day of January, A. D. 1920.

ARTHUR CLIVE BANFIELD.